(12) United States Patent
Huang et al.

(10) Patent No.: US 11,169,710 B2
(45) Date of Patent: *Nov. 9, 2021

(54) METHOD AND APPARATUS FOR SSD STORAGE ACCESS

(71) Applicant: Futurewei Technologies, Inc., Plano, TX (US)

(72) Inventors: Yiren Huang, San Jose, CA (US); Yong Wang, Sunnyvale, CA (US); Kui Lin, Redwood City, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/144,616

(22) Filed: Sep. 27, 2018

(65) Prior Publication Data

US 2019/0138221 A1 May 9, 2019

Related U.S. Application Data

(63) Continuation of application No. 13/477,924, filed on May 22, 2012, now Pat. No. 10,089,017.

(Continued)

(51) Int. Cl.
G06F 3/06 (2006.01)

(52) U.S. Cl.
CPC ............ *G06F 3/0611* (2013.01); *G06F 3/064* (2013.01); *G06F 3/0625* (2013.01);
(Continued)

(58) Field of Classification Search
CPC ...... G06F 3/0611; G06F 3/0625; G06F 3/064; G06F 3/0658; G06F 3/0659;
(Continued)

(56) References Cited

U.S. PATENT DOCUMENTS

| 5,764,972 A | 6/1998 | Crouse et al. |
| 6,324,620 B1 | 11/2001 | Christenson et al. |

(Continued)

FOREIGN PATENT DOCUMENTS

| CN | 1494792 A | 5/2004 |
| CN | 1853232 A | 10/2006 |
| CN | 101196889 A | 6/2008 |

OTHER PUBLICATIONS

NVM Express, Revision 1.0c, Feb. 16, 2012, 126 pages.

*Primary Examiner* — David Yi
*Assistant Examiner* — Tahilba O Puche
(74) *Attorney, Agent, or Firm* — Slater Matsil, LLP

(57) ABSTRACT

A media management system including an application layer, a system layer, and a solid state drive (SSD) storage layer. The application layer includes a media data analytics application configured to assign a classification code to a data file. The system layer is in communication with the application layer. The system layer includes a file system configured to issue a write command to a SSD controller. The write command includes the classification code of the data file. The SSD storage layer includes the SSD controller and erasable blocks. The SSD controller is configured to write the data file to one of the erasable blocks based on the classification code of the data file in the write command. In an embodiment, the SSD controller is configured to write the data file to one of the erasable blocks storing other data files also having the classification code.

21 Claims, 4 Drawing Sheets

Related U.S. Application Data

(60) Provisional application No. 61/509,930, filed on Jul. 20, 2011.

(52) U.S. Cl.
CPC .......... G06F 3/0658 (2013.01); G06F 3/0659 (2013.01); G06F 3/0688 (2013.01); *Y02D 10/00* (2018.01)

(58) Field of Classification Search
CPC ...... G06F 3/0688; G06F 16/285; G06F 16/35; Y02B 60/1246; H04L 67/2842; H04L 65/4084; H04L 69/329; H04L 67/2814; H04L 41/0893; H04L 47/2441; H04L 29/06462
See application file for complete search history.

(56) References Cited

U.S. PATENT DOCUMENTS

| | | | |
|---|---|---|---|
| 7,251,649 B2 * | 7/2007 | Shen | G06F 16/9574 711/113 |
| 7,254,668 B1 | 8/2007 | Chang et al. | |
| 7,925,851 B2 | 4/2011 | Matsunami et al. | |
| 8,380,676 B1 | 2/2013 | Eastham et al. | |
| 8,775,368 B1 * | 7/2014 | Burke | G06F 16/122 707/609 |
| 2002/0029313 A1 | 3/2002 | Funakoshi | |
| 2004/0139042 A1 | 7/2004 | Schirmer et al. | |
| 2004/0236859 A1 | 11/2004 | Leistad et al. | |
| 2005/0171965 A1 | 8/2005 | Fujimoto et al. | |
| 2007/0067575 A1 | 3/2007 | Morris et al. | |
| 2007/0073963 A1 | 3/2007 | Fontijn et al. | |
| 2008/0140691 A1 | 6/2008 | Li et al. | |
| 2010/0030947 A1 | 2/2010 | Moon et al. | |
| 2010/0030948 A1 | 2/2010 | Moon et al. | |
| 2010/0064111 A1 * | 3/2010 | Kunimatsu | G06F 12/08 711/161 |
| 2010/0070448 A1 | 3/2010 | Omoigui | |
| 2010/0082879 A1 | 4/2010 | McKean et al. | |
| 2010/0131671 A1 | 5/2010 | Kohli et al. | |
| 2010/0235438 A1 | 9/2010 | Narayanan et al. | |
| 2010/0235542 A1 | 9/2010 | Visharam et al. | |
| 2010/0235569 A1 | 9/2010 | Nishimoto et al. | |
| 2010/0306581 A1 | 12/2010 | Johnson | |
| 2011/0010488 A1 | 1/2011 | Aszmann et al. | |
| 2011/0047316 A1 | 2/2011 | Farhan et al. | |
| 2011/0107042 A1 | 5/2011 | Herron | |
| 2011/0110158 A1 | 5/2011 | Schuette | |
| 2011/0131472 A1 | 6/2011 | Antonakopoulos et al. | |
| 2011/0173484 A1 | 7/2011 | Schuette et al. | |
| 2011/0264843 A1 * | 10/2011 | Haines | G06F 12/0246 711/103 |
| 2012/0317337 A1 * | 12/2012 | Johar | G06F 12/0246 711/103 |

* cited by examiner

METHOD AND APPARATUS FOR SSD STORAGE ACCESS

CROSS-REFERENCE TO RELATED APPLICATIONS

This patent application is a continuation of U.S. patent application Ser. No. 13/477,924, filed on May 22, 2012, entitled "Method and Apparatus for SSD Storage Access," which claims priority to U.S. Provisional Application No. 61/509,930, filed on Jul. 20, 2011, entitled "Method and Apparatus for SSD Storage Access," all of which applications are hereby incorporated herein by reference as if reproduced in their entireties.

TECHNICAL FIELD

The present disclosure relates to communications systems and methods, and, in particular embodiments, to a method and apparatus for SSD storage access.

BACKGROUND

Non-volatile memories have been used as memories in computers and portable information apparatuses. Recently, solid state drives (SSD) using NAND flash memory have gained in popularity for use in a computers as an alternative to using simply a hard disk drive (HDD). SSD is considered to have great potential for making inroads in areas of use traditionally considered as limited to HDDs.

SUMMARY

Technical advantages are generally achieved by embodiments of the present disclosure which provide a method and apparatus for solid state drive (SSD) storage access for improving SSD performance and life span.

In an embodiment, a media management system including an application layer, a system layer, and a solid state drive (SSD) layer. The application layer includes a media data analytics application configured to assign a classification code to a data file. The system layer is in communication with the application layer and includes a file system configured to issue a write command to a SSD controller. The write command incorporates the classification code of the data file. The SSD storage layer is in communication with the system layer and includes the SSD controller and erasable blocks. The SSD controller is configured to write the data file to one of the erasable blocks based on the classification code of the data file in the write command.

In an embodiment, a media management system including an application layer, a system layer, and a solid state drive (SSD) layer. The application layer includes a media data analytics application configured to assign a classification code to a data file. The system layer is in communication with the application layer and configured to issue a write command to a SSD controller. The write command incorporates the classification code of the data file. The SSD storage layer is in communication with the system layer and includes the SSD controller and erasable blocks. The SSD controller is configured to write the data file to one of the erasable blocks storing other data files also having the classification code.

In an embodiment, a method of storing media in a solid state drive (SSD) including receiving a classification code for a data file from a media data analytics application in an application layer and issuing a write command to a SSD controller. The write command instructs the SSD controller to store the data file in an erase block where other data files also having the classification code are stored.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of the present embodiments are discussed in detail below. It should be appreciated, however, that the present disclosure provides many applicable inventive concepts that may be embodied in a wide variety of specific contexts. The specific embodiments discussed are merely illustrative and do not limit the scope of the disclosure.

The recent advent of using solid state drives (SSD) as intermediate storage between CPU memory (RAM) and hard disk drive (HDD) or as a direct replacement of HDD has enabled a generation of new system architecture. In such a new system architecture, the SSDs are increasingly used to increase access speed to stored (or cached) data, reduce storage drive failure rate (e.g. HDD), reduce the size, weight, and power consumption profile of the system, and reduce the access latency to the stored (or cached) data. For example, SSDs can be used in a content delivery network (CDN) to accelerate the data access.

In spite of SSD's apparent advantages, it has some weakness. For example, the life span (i.e., the number of writes that can be sustained) of SSD is often limited. This is due to the limited Program/Erase cycles of NAND flash memory, especially for MLC (Multi-Level cell) type NAND flash. SSDs may also have other weaknesses such as restrictions of how data is written into and erased from the SSD storage blocks, which results in inefficient SSD access, and the cost of SSD per gigabyte (GB) compared to HDD or tapes is higher.

Embodiments of the present disclosure target the first two aspects of the SSD's weakness. Indeed, embodiments of present disclosure help to extend the life span of the SSDs by classifying the data to be stored to the SSD and by storing the data according to the class value of the data. An embodiment method and apparatus uses the inherent characteristics of the storage data (e.g., hotness of content to be cached in SSD) in order to improve various performance matrices for an SSD based storage system.

As will be more fully explained below, a scheme is proposed whereby the SSD storage blocks are divided into types based on the data's class, which reflects data's characteristics including, but not limited to, the data's expected life span so that like kind content/data is stored together within the same SSD erase block. Doing so reduces the need to copy valid data from a used block to a new block to free up the room on SSD (which is referred to as "garbage collection" for NAND based SSD).

Analysis shows that this set of methods greatly improves SSD access based on common content access patterns. Given that video content traffic will account for over 90% of the IP traffic in 2014, that SSD data blocks sizes continue to increase, and that the need for faster I/O will drive towards greater parallelism, embodiments could have implications for all systems/networks that use SSD for storage/cache of the online content.

Figure 1:
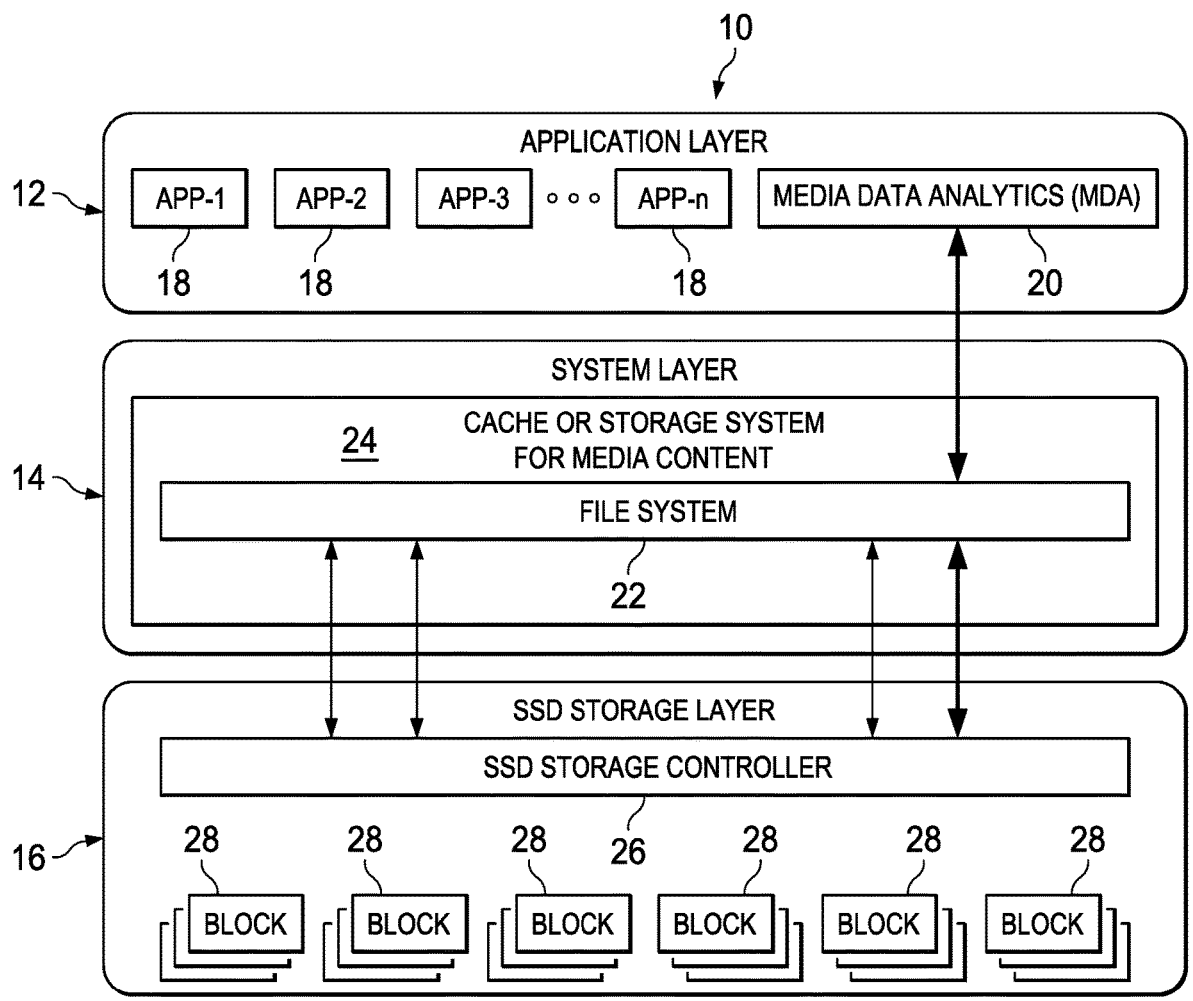
FIG. 1 illustrates a context diagram of a typical media system with a solid state drive (SSD)

Referring now to FIG. 1, a media system 10 implementing SSD storage using three layers is illustrated in FIG. 1. As shown in FIG. 1, the media system 10 includes an application layer 12, a system layer 14, and a SSD storage layer 16 (which represents, and be referred to herein, as the SSD). The application layer 12 is in communication with the system layer 14. Such communication may occur through or by virtue of, for example, a central processing unit (CPU) of an electronic device (e.g., computer, server, tablet device, smart phone, etc.). The system layer 14 is in communication with the SSD storage layer 16. Such communication may occur through, for example, a Peripheral Component Interconnect Express (PCIe) interface. Other interfaces or methods of communication may also be used in different embodiments. Also, in some embodiments the application layer 12, the system layer 14, and the SSD storage layer 16 and their respective functions and features may be combined such that fewer than three layers are employed.

The application layer 12 includes a variety of applications 18. The applications 18 may be, for example, software or programs capable of accessing media, data, content, and the like, when executed by the CPU or other processor. The applications 18 may be running or executable at the request of a user. The application layer 12 also includes a media data analytics (MDA) application 20 or engine. As will be more fully explained below, the media data analytics application 20 is configured to assign a classification code to a data file. The application layer 12, which includes the media data analytics application 20, represents the generic application and content services layer that uses the lower system layers for storage services.

The system layer 14 may be, for example, an operating system (OS) that manages computer hardware resources and provides common services for application software. Indeed, in an embodiment the system layer 14 may represent an operating system such as Microsoft Windows, Linux, and so on. As shown, the system layer 14 includes a file system 22 configured to issue a write command to, for example, a SSD controller or other device. As will be more fully explained below, the write command incorporates or includes the classification code of the data file, which classification code was determined by the media data analytics application 20 noted above.

In an embodiment, an implementation of the system layer 14 is the file system 22 in FIG. 1. However, in another embodiment, another implementation of the system layer 14 may be a block-based key-value storage system.

The system layer 14 may also include or support a cache or storage system 24 for media content. In an embodiment, the cache or storage system 24 is a static random-access memory (SRAM) or another type of memory. While the file system 22 is depicted within the cache or storage system 24 in FIG. 1, the file system 22 may be otherwise located or configured. For example, the file system 22 may be found on a network server or accessed through a distributed system.

The system layer 14, which provides or oversees storage services, may accept data (such as a file, or key value pair data) along with additional metadata that describes the nature of the data. The additional metadata may be a set of system/application assigned classification codes designed for optimal SSD storage.

The SSD storage layer 16 includes an SSD controller 26 and erasable blocks 28. The SSD controller 26 is configured to receive, for example, the write command issued by the file system 22 of the system layer 14. The SSD controller 26 is also configured to write a data file to one of the erasable blocks based on the classification code of the data file in the write command. Indeed, the SSD controller 26 is configured to write the data file to one of the erasable blocks 28 that is already or currently storing other data files also having the classification code. In other words, the SSD controller 26 is able to write the data file to one of the erasable block storing other data files that share the same classification code with the data file.

Each of the erasable blocks 28 in FIG. 1 is configured to store pages of data or content. In an embodiment, each of the erasable blocks 28 is capable of storing two hundred and fifty-six (256) pages of data or content. An erasable block 28 is generally considered the minimum unit in NAND flash memory that can be erased at one time. Therefore, in an embodiment, when an erasable block 28 is erased the entire 256 pages are erased at the same time. Although not shown in FIG. 1, several of the erasable blocks 28 may be included on a memory die, several of which may be included in a memory chip.

In an embodiment, a scheme is used to classify the data to be stored in the erasable blocks 28 of FIG. 1 into different classes. As will be more fully explained below, once the data has been classified, the class information is passed to the SSD controller 26 either before (using the logical block address space) or when data is actually stored onto erasable blocks 28 of the SSD storage layer 16 (i.e., stored into the SSD).

In an embodiment, the data is assigned a classification according to the data's predicted life (e.g., the time between when the data is written into SSD to the time the data is declared obsolete by the system/application, and therefore, no longer used). A method has been devised to assign a class associated with any given piece of data to be written into the SSD, which reflects the likely 'life span' of the associated data block 28. This associated class information is then used to select the suitable erasable block 28 of the SSD storage layer 16 or the best suited group of erasable blocks 28 for storage.

Media data analytics performed by the media data analytics application 20 or engine and methods will now be described. For simplicity of illustration, two examples of deriving classification codes illustrating how the classification system and method work are provided.

Example A

Classification Code: content hotness level, 1, 2, j, . . . , n, where j, n are positive integers j≤n; where n can be configured per system/service needs. Here shows an example where n=5 and the class code is denoted CC:

CC=1: Red hot content that always stays in system cache
CC=2: Hot content that likely stays in system cache
CC=3: Warm content that is moderately requested and may stay in cache CC=4: Colder content that is less used, but get occasional burst of requests CC=5: Very cold content that is rarely requested (long tail content)

Example B

Classification Codes: x, y, where x represents content hotness level: 1, 2, x, . . . , m, where x, m are positive integers 1≤x≤m; where m can be configured per system/service needs. Here shows an example where m=5; and where y represents content types: 1, 2, y, . . . , n, where y, n are positive integers i≤y≤n; where n can be configured per system/service needs. Here shows an example where n=5;

CC=y=1, x=1: Video file, red hot content
CC=y=1, x=2: Video file, hot content
CC=y=1, x=3: Video file, warm content
CC=y=1, x=4: Video file, colder content
CC=y=1, x=5: Video file, very cold content
CC=y=2, x=1: Audio file, red hot content
CC=y=2, x=2: Audio file, red hot content
CC=y=2, x=3: Audio file, hot content
CC=y=2, x=4: Audio file, warm content
CC=y=2, x=5: Audio file, colder content
CC=y=3, x=1: Application data (Web, email, Apps, etc.), red hot content
CC=y=3, x=2: Application data, hot content
CC=y=3, x=3: Application data, warm content
CC=y=3, x=4: Application data, colder content
CC=y=3, x=5: Application data, very cold content
CC=y=4, x=1: System persistent data, red hot content
CC=y=4, x=2: System persistent data, hot content
CC=y=4, x=3: System persistent data, warm content
CC=y=4, x=4: System persistent data, colder content
CC=y=4, x=5: System persistent data, very cold content
CC=y=5, x=1: System transient data, red hot content
CC=y=5, x=2: System transient data, hot content
CC=y=5, x=3: System transient data, warm content
CC=y=5, x=4: System transient data, colder content
CC=y=5, x=5: System transient data, very cold content It is noted that these examples are for illustrations only and may be used flexibly depending on real world requirements and applications. Classification codes (CC) may be single dimensional (e.g., Example A) extensible as the services, and hence, the need for more classification codes grows. Classification codes (CC) may also be multi-dimensional (e.g., Example B) extensible. For implementation at the system layer 14 that expects a single value classification code, the above multi-dimension classification code scheme may be mapped (hashed, for example) to a single number or digit classification code.

In an embodiment, the classification codes are added to the header of a data file as an extension field(s). These extension fields are only recognized by a system that understands classification codes and may therefore act upon them. A system without the awareness of the classification code concept will simply ignore these added field(s).

A classification code group is a set of content that shares or has the same classification code. In other words, each piece or unit of data in the classification code group has been assigned the same classification code.

In an embodiment, heuristics may be used for assigning classification codes. There are many ways to assign a classification code for a set of content such that the content assigned to a given classification code group has a high probability of having a similar life span when cached or stored. Embodiments of this disclosure provide a general set of methods and the apparatus for assigning classification codes to each unit of content given prior history and metadata associated with the set of content.

In an embodiment, the task of assigning a classification code to content depends on the types and semantics of the classification code scheme. In Example A above, the hotness (of a classification code group) is directly associated with its life span (a time period when the content is in demand) within the cache/storage system 24. Therefore, identifying the likely life span for content is used for an Example A type of classification.

The history of content usage often provides a good predictor for a similar geography, similar user base, and social context, and so on. In an embodiment, the media data analytics application 20 is a distributed data analytics platform that analyzes all the possible inputs to derive such correlations between content. For example, the usage pattern for a piece of content over different time zones within a country may provide a reliable predictor of how that content will likely be used as the time rolls over to the next time zone. The media data analytics application 20 may be used to reassign classification codes to files depending on such inputs information over time.

Another example is content with similar viewing stats (e.g., contents that are made into the top ten viewed) perhaps should be classified into the same classification code group. Since in an embodiment the media data analytics application 20 is a system that is constantly calculating the statistics for each piece of content in the system/service, this classification may evolve over time as demand changes.

Figure 2:
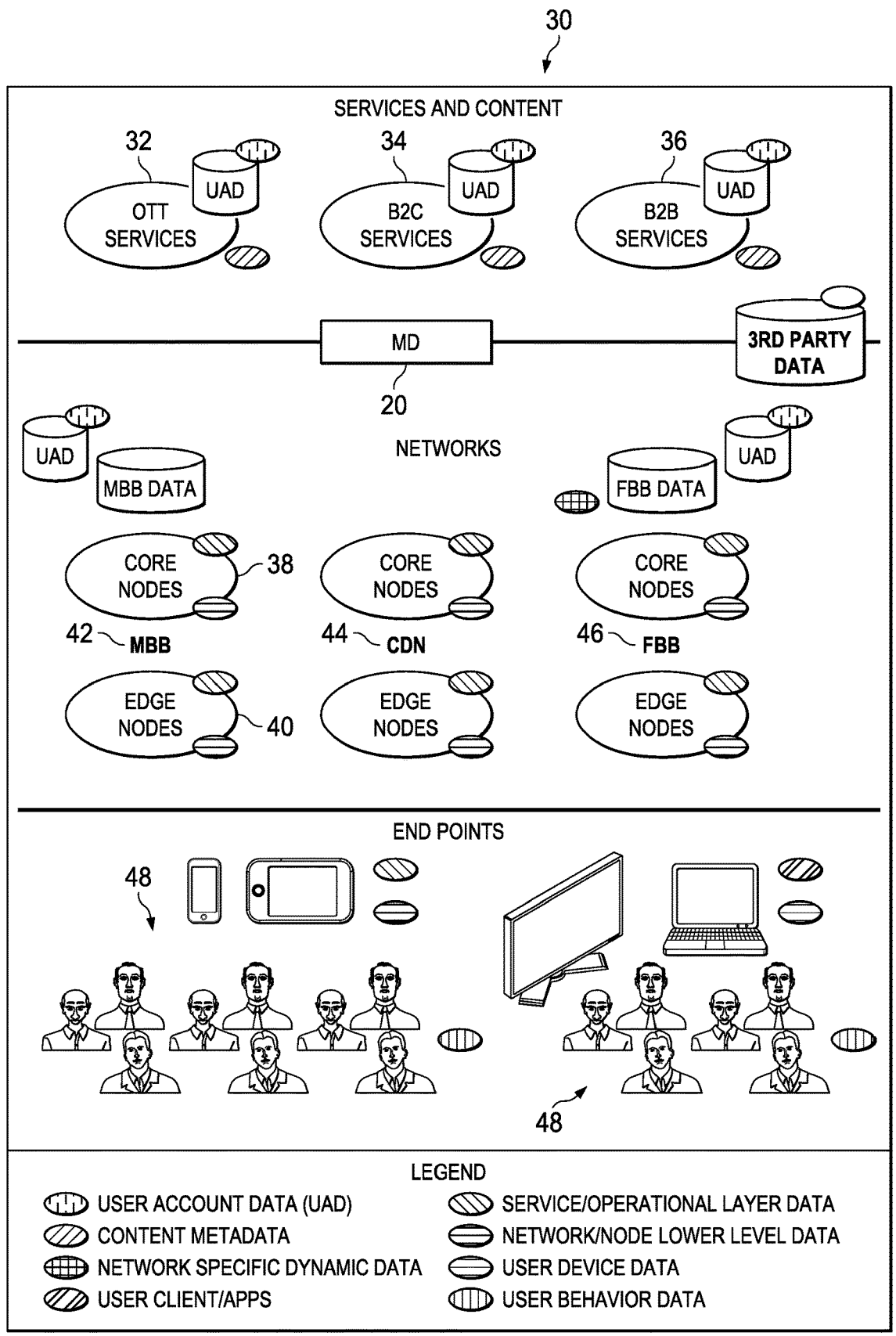
FIG. 2 provides a diagram to illustrate data sources for a media data analytics application or engine to analyze and assign class codes (CC) to units of data to be stored in the SSD of FIG. 1.

The diagram in FIG. 2 shows some examples of the sources 30 of data that can be collected and analyzed to provide input to the content classification code assignment heuristics. Indeed, the media data analytics application 20 may consider and utilize, for example, over the top (OTT) services 32, business to consumer (B2C) services 34, and business to business (B2B) services 36, which includes the user account data (UAD) and the content metadata. The media data analytics application 20 may also consider and utilize, for example, core nodes 38 and edge nodes 40 from mobile broadband (MBB) networks 42, content delivery networks (CDN) 44, and fixed broadband (FBB) networks 46. In addition, the media data analytics application 20 may consider and utilize, for example, end points 48 such as user client applications, user device data, and user behavior data.

The content classification may also be based on the original metadata from the content providers. Content classification assignment may also be based on their tags, key words, or other metadata associated with the content or added by the users or service providers after the content has been created. Content that has similar tags or has metadata containing the same or similar key words may be searched for together based on the key words search requests.

Referring back to FIG. 1, additional system layer 14 operation and methods will now be described. In an embodiment, the system layer 14 of FIG. 1 is an intermediate layer that communicates with applications (e.g., 18, 20) in the application layer 12 and the SSD controller 26 of the SSD storage layer 16. Using corresponding interfaces/protocols, the system layer 14 accepts I/O instructions from the applications and forwards these instructions to the SSD controller 26. In this procedure, class information generated by the media data analytics application 20 (or analyzer) may be passed via said interfaces/protocols as a parameter.

In traditional file systems, an interface that may be employed when applications ask the file system to write data is illustrated below.

int write(fid, data, size);
where:
fid: file handle
data: the data that is to be written
size: the size of the data in bytes In embodiments of the disclosure, if the file system 22 is deployed, an interface between applications and the file system may be:
int write(fid, data, size, class);
where:
fid: file handle
data: the data that is to be written
size: the size of the data in bytes
class: the class information of the to-be-written data If a key-value storage system is employed instead of the file system 22 in the system layer 14, an interface employed when applications ask the system layer 14 to write data may be:
int write(key, key_size, value, value_size, class);
where:
key: the key that distinguishes the to-be-written value
key_size: the size of the key
value: the value that is to be written
value_size: the size of the value
class: the class information of the to-be-written value The communication between the system layer 14 and the SSD controller 26 may use a separate interface/protocol. In an example implementation, the interface may be:
int write_ssd(lba, data, size)
where:
lba: Logical Block Address
data: the data that is to be written
size: the size of the data in an appropriate unit In such example implementations, the class information has been integrated in the logical block address and the SSD storage space has already been categorized into a different region, which corresponds to one of the classes.

Additional SSD controller 26 operations and methods may include the following approaches and benefits. For example, the SSD controller 26 may classify the block data received according to the incoming class value as passed on by the file system 22 or according to the logical block address of the data based on pre-written classifying rules as indicated by file system layer methods. In addition, the SSD controller 26 may group the block data according to the class value determined through any of the above classification methods before writing the data into the erasable blocks 28 of the SSD 16 device. As such, different classes of data are written into different blocks of the SSD and similar classes of data are written into similar blocks of the SSD.

When needed in the media system 10, garbage collection may be implemented according to the class value as stored in the SSD 16. As such, different classes of data will be sorted to different new blocks of the SSD. Due to the data stored according to its associated class value, the life span of the data within the same erasable block 28 tends to be obsolete at or around the same time. So, the obsolete data on the same erasable block 28 as stored on SSD 16 can be garbage collected together without incurring as much overhead of re-writing the valid data within the same erasable blocks 28 relative to when that data is not sorted or classified prior to or when written into SSD.

In the best scenario, all data of the same class in the same erasable block 28 becomes obsolete at the same time and the erasable block 28 just needs to be erased without copying any other valid data from the erasable block 28 to other new NAND flash erasable block 28. This will reduce the write amplification in the SSD storage layer 16, greatly improve SSD background processing, and improve the performance of the SSD as well.

In another scenario, all data of the same class in the same erasable block 28 becomes obsolete at about the same time (i.e., there is a short time interval between when one unit of data becomes obsolete relative to another unit of data on the same block). The later time point of that interval may be chosen by the SSD controller 26 so that most of the data in the same erasable block 28 becomes obsolete when the erasable block 28 undergoes garbage collection. In this case, the efficiency of garbage collection will still be much better than if data is written randomly without classification.

Figure 3:
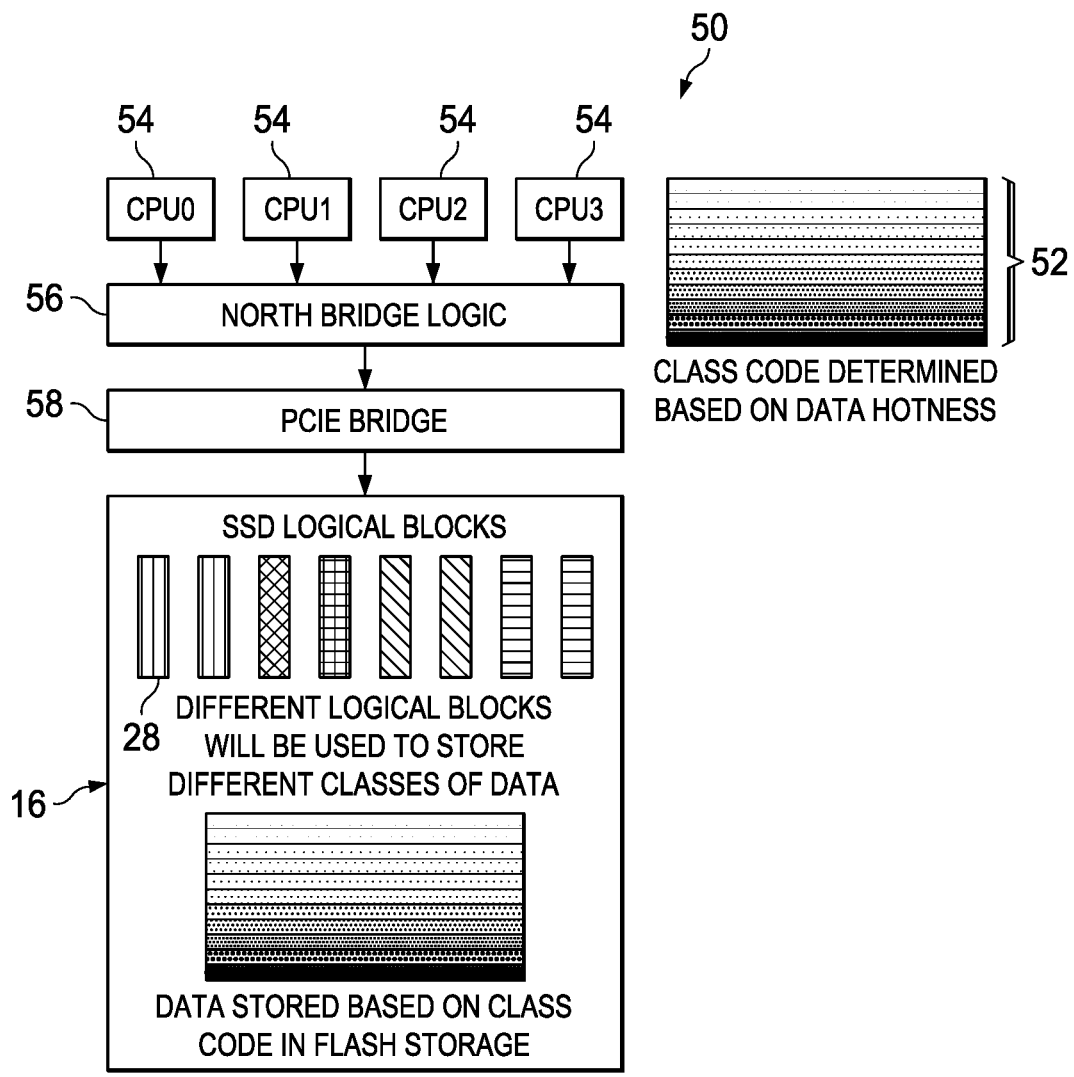
FIG. 3 provides a diagram to illustrate class code usage for the SSD and the system of FIG. 1.

Referring now to FIG. 3, a diagram 50 illustrates an embodiment of how class codes may be determined by a CPU 52 and then passed to the SSD storage layer 16 for use in storing data to certain erasable blocks 28 based on the class code. In an embodiment, the CPU 52 comprises several CPU cores 54 and north bridge logic 56. The CPU 52 is configured to execute or operate, for example, the application layer 12 and the system layer 14 of FIG. 1. The PCIe bridge 58 is the interface that permits the classifications determined by the CPU 52 of the system layer 14 to be transferred to the SSD storage layer 16. As shown, the data is stored in the erasable blocks 28 of the SSD storage layer 16 based on classifications. Indeed, in an embodiment data that shares the same classification is all stored in the same erasable block 28 to the extent practical.

Figure 4:
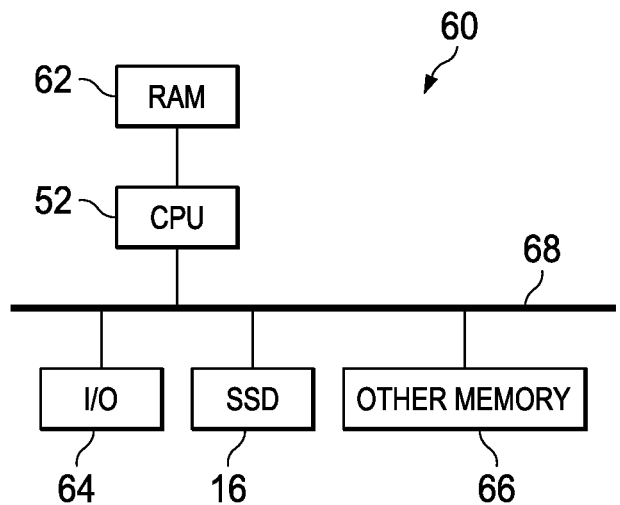
FIG. 4 illustrates a system that can implement embodiments of the disclosure.

FIG. 4 provides a simplified block diagram of an embodiment computer system 60 including the SSD 16, the CPU 52 or other processor, memory 62 (labeled RAM), an input/output port 64 or interface, and other memory 66. The computer system 60 may be utilized to implement methods of the present disclosure. In FIG. 4, the main processing is performed in the CPU 52, which may be a microprocessor or any other appropriate processing device. Program code (e.g., the code implementing the algorithms disclosed above) and data may be stored in the memory 62. The memory 62, which may store the application layer 12 and/or the system layer 14, may be local memory such as DRAM or mass storage such as a hard drive, optical drive, or other storage (which may be local or remote). While the memory 62 is illustrated functionally with a single block, it is understood that one or more hardware blocks can be used to implement this function.

In one embodiment, the CPU 52 may be used to implement various ones (or all) of the functions discussed above. For example, the CPU 52 may serve as a specific functional unit at different times to implement the subtasks involved in performing the techniques of the present disclosure. Alternatively, different hardware blocks (e.g., the same as or different than the processor) can be used to perform different functions. In other embodiments, some subtasks are performed by the CPU 52 while others are performed using a separate circuitry.

FIG. 4 also illustrates the I/O port 64, which may be used to provide information to the computer system 60. This information could include, for example, video to be stored in the SSD 16. The I/O port 64 may include ports for connection to a network, including the Internet or local interfaces (e.g., a USB or LAN interface). The I/O port 64 may also include local user I/O such as display, keyboard, mouse, and so on. In other words, the one box is provided for the I/O port 64 to represent a potentially large number of hardware items.

The SSD 16 and other memory 66 (e.g., HDD, optical drive, or other) are shown connected to the same bus 68 as the I/O port 64, the CPU 52, and the memory 62 (RAM). This is just one example of an architecture that can be used. For purposes of simplicity, control circuitry, such as a memory controller or bridge, has been omitted from the drawing even though a practical system will include additional circuitry as appropriate.

Figure 5:
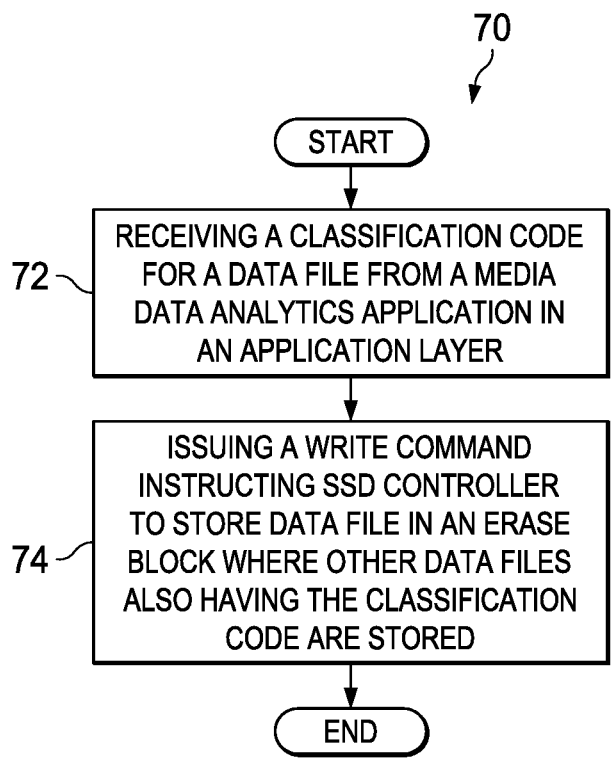
FIG. 5 provides an embodiment of a method of media storage in the SSD of FIG. 1.

Referring now to FIG. 5, an embodiment of a method 70 of media storage in the SSD 16 from the perspective of the system layer 14 is illustrated. In block 72, the system layer 14 receives a classification code for a data file from the media data analytics application 20 in the application layer 12. In 74, a write command is issued to the SSD controller 26. The write command instructs the SSD controller 26 to store the data file in an erase erasable block 28 where other data files also having the same classification code are stored.

Embodiments of the present disclosure provide a number of new and advantageous features. One feature of this scheme is to first classify the data to be stored onto the SSD 16 based on predicted lifespan. Embodiments of the scheme provide two ways to pass the class value to the SSD controller 26, i.e., either through the software interface to the SSD controller 26 or through some special allocated logical block address space. Embodiments of the scheme are also new in that SSD 16 will store the data based on the class value classified.

Embodiments of the disclosure are unique in that they use a method based on predicted hotness of content to be written into the SSD 16. Embodiments of the present disclosure may be implemented in a number of products, processes, and services. For example, embodiments of the disclosure may be used in next generation PCIE SSD. One product type could be PCIE SSD storage blade in Media storage product. Embodiments of the disclosure may also be used in next generation content delivery network (CDN) software for media storage systems and media storage cache systems.

Embodiments of the disclosure may improve the life span and background garbage collection efficiency of the SSD 16. Features disclosed herein may make SSD storage more efficient and provide a longer life span. Enterprise storage and content delivery network storage markets may benefit from these features.

As disclosed above, embodiments of the disclosure may provide a number of benefits. By classifying the data to SSD storage into different classes, improved SSD performance and efficiency may be achieved. The benefit to SSD is in terms of reduction of write amplification factor, write bandwidth, and life span of the SSD. Benefits can also be achieved by having software recognize the class of data or files to be stored in the SSD storage system and inform the SSD storage system about the class.

In the present disclosure, files/data are first classified into different classes so that when they are stored in SSD storage, the data gets differentiated. As a result, the SSD is able to write different types of data into different erasable blocks. Therefore, the write amplification factor is reduced and performance is improved.

Embodiments of the disclosure also address the need for the exchange of the actual content life span information among the SSD controller 26/storage layer 16, system layer 14 (file system/cache management), and the application layer 12 (Data Analytics Engine). The exchange of actual life span data is used to improve on system performance and content life span predictability.

Embodiments of the disclosure combine all three areas of intelligence and heuristics in order to achieve optimal performance of underlying SSD 16 life span. In an embodiment, there are three main areas of contributions, one from each layer, to achieve an overall high performance:

1. Utilize media data analytics to provide initial media classification code (CC) based on prior knowledge and historical data.

2. Utilize intrinsic nature of continuous media data within a media file as a classifier. For example, contiguous media chunks within the same file are likely to have similar life span, and therefore, can be treated as having the same life span or same classification code.

3. Utilize optimization at the SSD controller layer for:
   a. data migration—in order to clear a data block; and
   b. use classification code of data in write operations so same class of data is written into same NAND flash block as to optimize SSD data blocks' life span.

Embodiments of the present disclosure may be implemented using software, hardware, firmware, and combinations thereof.

While the disclosure has been made with reference to illustrative embodiments, this description is not intended to be construed in a limiting sense. Various modifications and combinations of the illustrative embodiments, as well as other embodiments, will be apparent to persons skilled in the art upon reference to the description. It is therefore intended that the appended claims encompass any such modifications or embodiments.

What is claimed is:

1. A media management system, comprising:
an application layer including a media data analytics application configured to assign a classification code to a data file having an expected life span, wherein the classification code includes a content type of the data file and a content hotness level of the data file;
a system layer in communication with the application layer, wherein the system layer includes a file system configured to issue a write command to a solid state drive (SSD) controller, and wherein the write command incorporates the classification code of the data file; and
an SSD storage layer in communication with the system layer, wherein the SSD storage layer includes the SSD controller and erasable blocks, wherein the SSD controller is configured to write the data file to one of the erasable blocks according to the classification code of the data file in the write command, wherein there are multiple classification codes, and wherein the SSD storage layer is configured to store all media data assigned any of the multiple classification codes by the media data analytics application.

2. The media management system of claim 1, wherein the media data analytics application is configured to assign the classification code according to a predicted life span of the data file.

3. The media management system of claim 1, wherein the media data analytics application is configured to assign the classification code according to an actual life span of the data file.

4. The media management system of claim 1, wherein the media data analytics application is configured to assign the classification code according to at least one of historical information or metadata corresponding to the data file.

5. The media management system of claim 1, wherein the media data analytics application is configured to assign the classification code according to heuristic information corresponding to the data file.

6. The media management system of claim 1, wherein the media data analytics application is configured to assign the classification code according to contiguous portions of the data file.

7. The media management system of claim 1, wherein the media data analytics application is configured to receive the classification code from a content provider.

8. The media management system of claim 1, wherein the media data analytics application is configured to determine the classification code according to a likelihood that the data file remains in a cache associated with the file system.

9. The media management system of claim 1, wherein the classification code is multi-dimensional.

10. The media management system of claim 1, wherein the SSD controller is configured to write the data file to one of the erasable blocks storing other data files also having the classification code.

11. A computer system, comprising:
a processor configured to:
execute an operating system of the computer system; and
determine a classification code for a data file having an expected life span, wherein the classification code includes a content type of the data file and a content hotness level of the data file; and
a solid state drive (SSD) storage device in communication with the processor, wherein the SSD storage device includes an SSD controller and erasable blocks, wherein the SSD controller is configured to, based on the classification code contained in a write command from the processor, write the data file to one of the erasable blocks storing other data files also having the classification code, wherein there are multiple classification codes, and wherein the SSD storage device is configured to store all media data having any of the multiple classification codes determined by the processor.

12. The computer system of claim 11, further comprising a memory, wherein the memory stores an application layer with a media data analytics application, and wherein the media data analytics application is engaged by the processor to assign the classification code to the data file.

13. The computer system of claim 11, further comprising a memory, wherein the memory stores a system layer with a file system configured to issue the write command to the SSD controller.

14. The computer system of claim 11, further comprising an input/output port configured to transport the data file to a network associated with the computer system.

15. The computer system of claim 11, further comprising at least one of a hard disk drive or an optical drive.

16. A method of media storage in a solid state drive (SSD), comprising:
receiving a classification code for a data file from a media data analytics application in an application layer, the classification code including a content type of the data file and a content hotness level of the data file; and
issuing a write command including the classification code to an SSD controller, the write command instructing the SSD controller to store the data file in one of a plurality of erasable blocks according to the classification code of the data file in the write command, there being multiple classification codes, and the SSD controller storing all media data having any of the multiple classification codes received from the media data analytics application.

17. The method of claim 16, wherein the write command instructs the SSD controller to store the data file in the one of the plurality of erasable blocks where other data files also having the classification code are stored.

18. The method of claim 16, wherein the classification code is in accordance with at least one of a predicted life span or an actual life span of the data file.

19. The method of claim 16, wherein the classification code is in accordance with at least one of historical information or metadata corresponding to the data file.

20. The method of claim 16, wherein the classification code is multi-dimensional.

21. The computer system of claim 11, wherein the classification code is multi-dimensional.

* * * * *